United States Patent
Rosedale

(10) Patent No.: US 10,729,160 B1
(45) Date of Patent: *Aug. 4, 2020

(54) MTOR PATHWAY OPTIMIZED NUTRITIONAL COMPOSITIONS

(71) Applicant: Ronald E Rosedale, Bellevue, WA (US)

(72) Inventor: Ronald E Rosedale, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,421

(22) Filed: Mar. 8, 2015

Related U.S. Application Data

(63) Continuation of application No. 12/896,594, filed on Oct. 1, 2010, now Pat. No. 8,974,843.

(51) Int. Cl.
| | | |
|---|---|---|
| *A23L 33/18* | (2016.01) | |
| *A23L 1/29* | (2006.01) | |
| *A23L 33/00* | (2016.01) | |
| *A23J 3/34* | (2006.01) | |

(52) U.S. Cl.
CPC . *A23L 1/29* (2013.01); *A23J 3/34* (2013.01); *A23L 33/18* (2016.08); *A23L 33/30* (2016.08)

(58) Field of Classification Search
CPC .......................................................... A23J 3/34
See application file for complete search history.

(56) References Cited

U.S. PATENT DOCUMENTS

| | | |
|---|---|---|
| 2,180,637 A | 11/1939 | Kemmerer |
| 4,427,658 A | 1/1984 | Maubois |
| 4,546,077 A | 10/1985 | Ohshima |
| 4,600,588 A | 7/1986 | Ernster |
| 4,960,868 A | 10/1990 | Canosi |
| 5,013,662 A | 5/1991 | Ben-Bassat |
| 5,077,062 A | 12/1991 | Ernster |
| 5,356,637 A | 10/1994 | Loosen |

(Continued)

OTHER PUBLICATIONS

Aducci et al. Plant Physiology 1986 vol. 81 pp. 812-816 "Purification and Characterization of Leu-Proteinase, the Leucine Specific Serine Proteinase from Spinach . . . " (Year: 1986).*

(Continued)

*Primary Examiner* — Felicia C Turner
(74) *Attorney, Agent, or Firm* — Stephen E. Zweig

(57) ABSTRACT

Method of reducing the mTOR pathway stimulating activity of amino acid containing nutritional materials. This method comprises treating an enzymatically hydrolysed protein material such as casein, whey, or soy protein with at least one enzyme capable of converting mTOR pathway stimulating amino acids and amino acid residues, such as leucine or methionine, into alternate chemical entities that do not stimulate or stimulate to a significantly lesser degree the mTOR pathway, while preserving the non-mTOR stimulating amino acids. These one or more alternate chemical entities should ideally be suitable for consumption, or alternatively be capable of being removed from the treated material through low cost extraction or conversion techniques. The material may then be sold as is, or alternatively packaged with low glycemic carbohydrates, healthy lipids, vitamins, and flavors and sold as a variety of different food products intended for an artificial diet intended to mimic the effects of caloric restriction.

11 Claims, 1 Drawing Sheet

(56) References Cited

U.S. PATENT DOCUMENTS

| | | |
|---|---|---|
| 5,486,461 A | 1/1996 | Nielsen |
| 6,036,983 A | 3/2000 | Nielsen |
| 6,455,273 B1 | 9/2002 | Kodera |
| 2005/0112177 A1* | 5/2005 | Dopson .............. A23C 21/08 424/439 |
| 2006/0088574 A1* | 4/2006 | Manning ............ A23L 33/40 424/439 |
| 2007/0009995 A1* | 1/2007 | Bogosian ........... C07K 14/61 435/69.4 |

OTHER PUBLICATIONS

Piper, Matthew et. al. "Counting The Calories: the Role of Specific Nutrients in Extension of Life Span by Food Restriction", J Gerontol A Biol Sci Med Sci (2005) 60 (5): 549-555.

Malloy, Virginia, et. al. "Methionine restriction decreases visceral fat mass and preserves insulin action in aging male Fischer 344 rats independent of energy restriction", Aging Cell (2006) 5, pp. 305-314.

Dann and Thomas, "The amino acid sensitive TOR pathway from yeast to mammals", FEBS Letters vol. 580, Issue 12, pp. 2821-2829, May 22, 2006.

Tang, Jason et. al., "Ingestion of whey hydrolysate, casein, or soy protein isolate: effects on mixed muscle protein synthesis at rest and following resistance exercise in young men", Journal of Applied Physiology vol. 107 No. 3, 987-992, 2009.

Kim, J. et. al., Characterization of Calcium-Activated Bifunctional Peptidase of the Psychrotrophic Bacillus cereus, The Journal of Microbiology, Jun. 2005, p. 237-243.

Aducci, Patrizia, "Esterolytic Properties of Leucine-Proteinase, the Leucine-Specific Serine Proteinase from Spinach (*Spinacia oleracea* L) Leaves", "Plant Physiology Oct. 1986 vol. 82 No. 2 591-593".

Deutsch, Stephanie-marie, "Hydrolysis of Sequenced β-Casein Peptides Provides New Insight into Peptidase Activity from Thermophilic Lactic Acid Bacteria and Highlights Intrinsic Resistance of Phosphopeptides", Appl. Environ. Microbiol. Dec. 2000 vol. 66 No. 12 5360-5367.

Folk and Schirmer "The Porcine Pancreatic Carboxypeptidase A System, I. Three forms of the Active Enzyme", J. Biol. Chem. 1963, 238:3884-3894.

Matsuyama, Takahiro "Leucine Dehydrogenase from Bacillus stearothermophilus: Identification of Active-Site Lysine by Modification with Pyridoxal Phosphate", J Biochem (1992) 112 (2): 258-265.

Frottin, Frederic, et. al. "The Proteomics of N-terminal Methionine Cleavage", Molecular & Cellular Proteomics 5.12 2336-2349 (2006).

Bonnamie, Pascal, et. al. "Diversity of L-Methionine Catabolism Pathways in Cheese-Ripening Bacteria", Appl. Environ. Microbiol. Dec. 2000 vol. 66 No. 12 5514-5517.

Perpete, Philippe, et. al. "Methionine catabolismin*Saccharomyces cerevisiae*", FEMS Yeast Res 6 (2006) 48-56.

Institute of Medicine 2005. Dietary Reference Intakes for Energy, Carbohydrate, Fiber, Fat, Fatty Acids, Cholesterol, Protein, and Amino Acids. Washington, DC: The National Academies Press. https://doi.org/10.17226/10490. Chapter 10, pp. 677 table 10-22, p. 680.

Meguid et. al. "Leucine kinetics at graded leucine intakes in young men", Am. J. Clinical Nutrition 43, May 1986, p. 770-780, p. 777 col. 2 paragraph 1.

\* cited by examiner

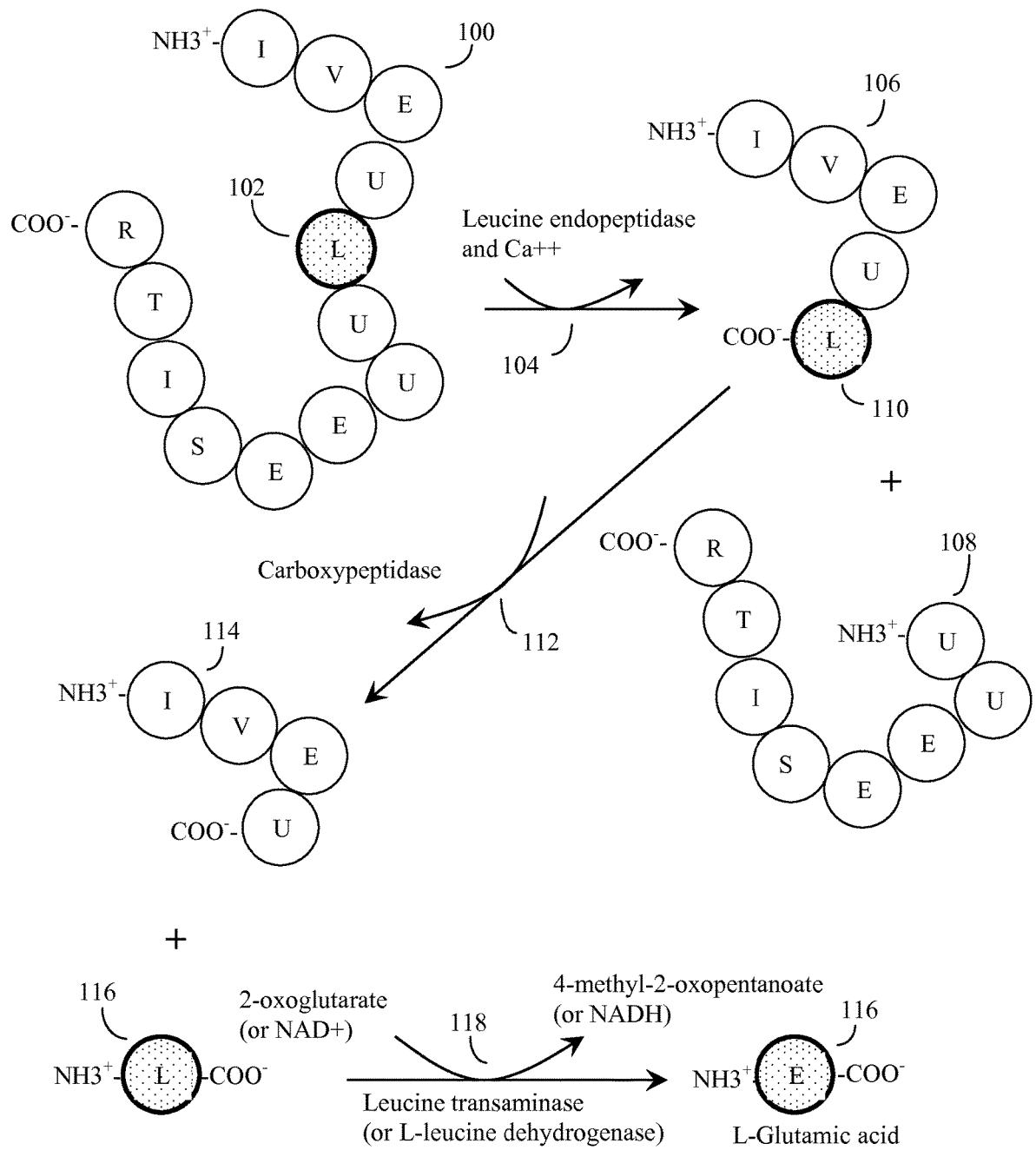

US 10,729,160 B1

MTOR PATHWAY OPTIMIZED NUTRITIONAL COMPOSITIONS

CROSS REFERENCE TO RELATED APPLICATIONS

This application is a continuation of U.S. patent application Ser. No. 12/896,594, "mTOR PATHWAY OPTIMIZED NUTRITIONAL COMPOSITIONS", inventor Ronald E Rosedale, filed Oct. 1, 2010, now U.S. Pat. No. 8,974,843; the entire contents of which are incorporated herein by reference.

BACKGROUND OF THE INVENTION

Field of the Invention

The invention is in the general field of nutrients, dietary supplements, and metabolic regulators.

Description of the Related Art

One of the few methods known to consistently produce prolongation of lifespan across multiple species is caloric restriction. Caloric restriction involves practicing a generally balanced diet, while restricting caloric intake levels to about 25-30% below the levels that an organism might normally consume. The impact of caloric restriction on short lived mammals, such as rodents, is impressive, with a near doubling of lifespan being reported. Studies of caloric restriction in primates, such as rhesus macaques, although still ongoing, have also demonstrated reduced death rates, as well as a marked decrease in age related conditions such as lower rates of cancer, diabetes, and heart disease. In humans, caloric restriction has been demonstrated to improve memory, as well as lower blood pressure, cholesterol, and triglycerides.

Despite these promising findings, caloric restriction is extremely difficult to follow, because individuals practicing caloric restriction are hungry essentially all of the time. Caloric restriction practitioners also suffer from increased sensitivity to cold, lower muscle mass, and may also be more prone to bone disorders. Thus there is a high level of interest in finding ways to produce the beneficial effects of caloric restriction through other means.

It is been known for many years that nutrients such as glucose and non fiber carbohydrates mediate many of their detrimental effects on the body through the activity of insulin, and indeed the problems caused by excess carbohydrates and excess insulin are well documented. Recently, studies have demonstrated that other nutrients, such as dietary amino acids have profound effects upon a recently discovered mTOR metabolic pathway, and the mTOR pathway in turn regulates many other metabolic pathways producing effects that are closely associated with the same effects obtained with caloric restriction. Indeed it has been postulated that the beneficial effects of caloric restriction may be secondary to regulatory effects of the mTOR pathway on an evolutionarily conserved genetic expression of maintenance and repair mechanisms resulting in the phenotype of longevity.

mTOR, which stands for the mammalian target of rapamycin, is a cell protein that has been found to regulate cell growth, proliferation, motility, and survival, as well as protein synthesis and protein transcription. mTOR essentially acts to integrate signals from multiple sources, including amino acids and insulin, and in turn pass these signals along to other regulatory proteins in the mTOR signaling pathway. mTOR is inhibited by the drug rapamycin, which interestingly has been shown to inhibit cancer and increase lifespan in rodents. As a result, there is much interest and speculation at present that the beneficial effects of caloric restriction may be mediated through the mTOR pathway, and further that finding alternate and safe ways to inhibit the mTOR pathway may have beneficial and possibly lifespan enhancing effects.

Although mTOR is stimulated by amino acids, studies have shown that not all amino acids stimulate mTOR equally. Rather, studies have consistently shown that one amino acid in particular, leucine, is by far the most potent stimulator of the mTOR pathway. Other work has suggested that another amino acid, methionine, may also be important, either through the mTOR pathway or through an analogous but as of yet poorly characterized alternate pathway.

Prior Publications in this Field Include:

*Counting the Calories: The Role of Specific Nutrients in Extension of Life Span by Food Restriction* Matthew D. W. Piper, William Mair, and Linda Partridge, Gerontological Society of America 2005, Vol. 60A (5) 549-555.

*Methionine restriction decreases visceral fat mass and preserves insulin action in aging male Fischer 344 rats independent of energy restriction.* Aging Cell. 2006 August; 5(4):305-14. Epub 2006 Jun. 26.

*The amino acid sensitive TOR pathway from yeast to mammals* Stephen G. Dann, George Thomas FEBS Letters 580 (2006) 2821-2829. This publication gives a good overview of the mTOR (target of rapamycin TOR pathway) and discusses how this pathway is an evolutionary preserved cell growth sensor of signals from growth factors and nutrients, particularly amino acids such as leucine.

BRIEF SUMMARY OF THE INVENTION

The invention is based, in part, upon the insight that if an inexpensive protein supplement could be produced that is generally nutritionally complete in terms of amino acid content, with the exception that those amino acids that most stimulate the mTOR pathway are significantly reduced or removed, then the beneficial effects of suppressing the mTOR pathway, and possibly the beneficial effects of caloric restriction, could be obtained without the necessity of having to otherwise suffer the hardships of caloric restriction.

An mTOR non-stimulating protein source or supplement might in turn be processed into mTOR optimized foods, for example foods that also have a low glycemic index and/or low glycemic load, and with supplementation from other essential vitamins and minerals might form the basis of a long term diet designed to increase the lifespan, or at least avoid many of the adverse metabolic effects of aging as long as possible.

In particular, an mTOR optimized protein supplement must, at a minimum, have unusually low levels of leucine. Other amino acids, such as methionine, may also be reduced, based upon preference and subsequent clinical studies.

Leucine is an essential amino acid that is present in essentially all natural protein sources. That is although some natural protein sources, such as beans or rice, are infamous for being incomplete as far as some essential amino acids go, few if any natural protein sources available in large volumes and low cost are significantly deficient in leucine.

There has been little prior art in the preparation of foods and nutrients that are deliberately deficient in leucine. However Mead Johnson produces a leucine-free infant formula (LMD leucine-free). This formula is made by simply adding purified essential amino acids to the formula, and omitting purified leucine from this mix. Such methods that essentially work by putting together a mix of purified amino acids are highly expensive however, and are unsuited for producing low cost leucine depleted nutrients intended to become a large part of the diet for an adult.

Unfortunately leucine is a difficult amino acid to deplete by purely chemical methods. It is an alphatic neutral amino acid, somewhat hydrophobic but by no means unusually so, and is difficult to fractionate from other amino acids by low cost, high volume techniques. Few if any chemical methods that selectively degrade leucine, while sparing other amino acids, have been reported.

The invention is thus based, in part, upon the insight that to produce large quantities of low cost nutrients that are depleted in leucine, but otherwise are generally complete in terms of essential amino acids, then enzymatic degradation methods are a preferred method. Further, since proteins in their native state are often folded into conformations that render portions of the protein difficult to attack by enzymatic methods, in a preferred embodiment, the invention will produce a leucine depleted but otherwise generally complete food through the use of enzymes that tend to be specific for leucine, acting upon proteins that may have been at least partially degraded into smaller peptides prior to the action of the leucine specific enzymes.

In one embodiment, the invention is a method of reducing the mTOR pathway stimulating activity of an amino acid containing nutritional material. This method will generally comprise treating a proteinaceous (containing protein) material with at least one enzyme capable of converting mTOR pathway stimulating amino acids (or amino acid residues in the proteinaceous material) into one or more alternate chemical entities that do not stimulate the mTOR pathway. These one or more alternate chemical entities should ideally be both non-toxic and suitable for consumption, or alternatively be capable of being removed from the enzyme treated proteinaceous material through low cost extraction or conversion techniques.

More specifically, in some embodiments, the invention may focus on significantly diminishing or removing some or all mTOR stimulating amino acids, such as leucine (or amino acids suspected of having mTOR like-stimulating effects, such as methionine), through the use of leucine specific enzymes such as endopeptidases, decarboxylases, transaminases, dehydrogenases and the like. These leucine specific enzymes, sometimes in combination with less specific proteases, may be used to specifically deplete a starting protein material of leucine. Often this starting protein material will be a pre-digested assortment of peptides such as the peptides produced by various prior-art enzymatic protein hydrolysates. The resulting process will produce large quantities of nutrient materials that have been specifically depleted in leucine and other amino acids of interest.

When used in combination with low cost commercially available protein hydrolysates, such as casein, whey, soy, egg, pea, rice, or other hydrolysates, the methods of the invention can produce an otherwise complete peptide and amino acid material that has been specifically designed to inhibit stimulating the mTOR pathway. This material may, in turn, be either sold directly as a powder or liquid, or alternatively processed with other nutrients, such as health optimized lipids, low glycemic carbohydrates, flavorants and colorants, into a wide variety of mTOR optimized foods, all designed to be available at low cost, making it economically feasible for at least motivated individuals to pursue and investigate the benefits and trade-offs associated with an mTOR pathway optimized diet for long periods of time.

BRIEF DESCRIPTION OF THE DRAWINGS

FIG. 1 shows an example of how a combination of leucine specific endopeptidase, decarboxylase, and transaminase or dehydrogenase enzymes can specifically deplete leucine from a mixture of peptides from a casein hydrolysate. Here a 13 amino acid long leucine peptide from bovine b-casein is shown being degraded into two smaller peptides (neither of which contains leucine) and the amino acid glutamine.

DETAILED DESCRIPTION OF THE INVENTION

As previously discussed, often the starting material for the process will be a protein hydrolysate. Although in principle, any protein hydrolysate may be used, often it will be convenient to utilize those low cost, commercially available protein hydrolysates that are often used for human nutritional purposes.

Examples of such commonly used protein hydrolysates include the milk-derived casein or whey hydrolysates, as well as other protein hydrolysates such as soy hydrolysates.

Although proteins may be degraded to smaller peptides and amino acids by chemical techniques, such as acid or alkali hydrolysis, pure chemical (non-enzymatic) methods have the drawback that they can convert L-amino acids to toxic D-amino acid forms, destroy essential amino acids, and produce toxic byproducts.

Thus, in order to preserve the nutritional content of the protein, prior art protein hydrolysis methods have tended to focus on the use of enzymatic digestion techniques using broad specificity proteases such mixtures of one or more enzymes such as papain, pepsin, trypsin, subtilisin, chymotrypsin as well as various microbial proteases.

One common problem associated with the production of protein hydrolysates is the production of bitter components that decreases the palatability of the hydrolysate. In particular, N-terminal amino hydrophobic amino acid residues may cause bitterness. Unfortunately, many of the commonly used proteases tend to specifically cleave at hydrophobic amino acid residues, resulting in a high proportion of peptides with amino acids present at the N or C terminals. Pepsin, for example, tends to cleave at the N terminal of hydrophobic amino acids such as phenylalanine, tryptophan, and tyrosine.

Fortunately, as will be discussed, the methods of this invention tend to some extent reduce the relative amount of N terminal hydrophobic amino acids in the mixture. Thus the methods discussed herein will generally not tend to increase the bitterness of the protein mix above and beyond the inherent bitterness of the starting material. Here, however, the primary intent of this invention is not to avoid producing a bitter protein mixture. This is because often the mixture of peptides and amino acids produced by the invention will be mixed with other materials, such as low glycemic carbohydrates, lipids, and the like, and indeed often the product of the invention will result in a solid food, such as a baked good, meat substitute, and the like. Thus just as the bitter effects of chocolate may be mediated by other materials, so any residual bitterness produced by the methods herein may also be counteracted by use of other materials.

The relative amounts of amino acids contained in various commonly used human protein hydrolysate mixtures are shown below in Table 1.

TABLE 1

Amino acid composition of three commercially available protein hydrolysates

| | Whey | Casein | Soy |
|---|---|---|---|
| Alanine g | 1.1 | 0.6 | 1 |
| Arginine g | 0.6 | 0.8 | 1.7 |
| Aspartic acid g | 2.2 | 1.4 | 2.6 |
| Cystine g | 0.4 | 0.1 | 0.3 |
| Glutamic acid g | 3.6 | 4.4 | 4.3 |
| Glycine g | 0.4 | 0.5 | 0.9 |
| Histidine g | 0.4 | 0.6 | 0.6 |
| Isoleucine g | 1.4 | 1.2 | 1.1 |
| Leucine g | 2.3 | 1.8 | 1.8 |
| Lysine g | 1.9 | 1.6 | 1.4 |
| Methionine g | 0.5 | 0.5 | 0.3 |
| Phenylalanine g | 0.7 | 1 | 1.2 |
| Proline g | 1.4 | 2.2 | 1.2 |
| Serine g | 1.1 | 1.2 | 1.2 |
| Threonine g | 1 | 0.9 | 0.8 |
| Tryptophan g | 0.3 | 0.2 | 0.2 |
| Tyrosine g | 0.7 | 1.2 | 0.8 |
| Valine g | 1 | 1.4 | 1.1 |
| Total g | 21.4 | 21.9 | 22.2 |
| EAA g | 10 | 10.1 | 10.1 |

The data in table 1 is taken from the paper by Tang et. al, "*Ingestion of whey hydrolysate, casein, or soy protein isolate: effects on mixed muscle protein synthesis at rest and following resistance exercise in young men*", J. Appl. Physiol 107: 987-992, 2009. Here the amounts of the various amino acids are normalized for a 250 meal-like liquid suspension adjusted to contain 10 grams of Essential Amino Acids (EAA) per serving.

Thus, a first object of the invention is to produce a protein based nutritional material that may, for example, have a nutritional composition similar to that shown in table 2.

TABLE 2

Hypothetical amino acid composition of a leucine depleted nutrient, produced according to the invention:

| | Whey | Casein | Soy |
|---|---|---|---|
| Alanine g | 1.1 | 0.6 | 1 |
| Arginine g | 0.6 | 0.8 | 1.7 |
| Aspartic acid g | 2.2 | 1.4 | 2.6 |
| Cystine g | 0.4 | 0.1 | 0.3 |
| Glutamic acid g | 3.6 | 4.4 | 4.3 |
| Glycine g | 0.4 | 0.5 | 0.9 |
| Histidine g | 0.4 | 0.6 | 0.6 |
| Isoleucine g | 1.4 | 1.2 | 1.1 |
| Leucine g | 0 | 0 | 0 |
| Lysine g | 1.9 | 1.6 | 1.4 |
| Methionine g | 0.5 | 0.5 | 0.3 |
| Phenylalanine g | 0.7 | 1 | 1.2 |
| Proline g | 1.4 | 2.2 | 1.2 |
| Serine g | 1.1 | 1.2 | 1.2 |
| Threonine g | 1 | 0.9 | 0.8 |
| Tryptophan g | 0.3 | 0.2 | 0.2 |
| Tyrosine g | 0.7 | 1.2 | 0.8 |
| Valine g | 1 | 1.4 | 1.1 |

Similarly a second object of the invention is to produce a nutrient depleted in both leucine and at least one other amino acid suspected of having an mTOR or mTOR-like stimulating activity, such as methionine. An example of this second object of the invention is shown below.

TABLE 3

Hypothetical amino acid composition of a leucine and other amino acid (here methionine) depleted nutrient, produced according to the invention:

| | Whey | Casein | Soy |
|---|---|---|---|
| Alanine g | 1.1 | 0.6 | 1 |
| Arginine g | 0.6 | 0.8 | 1.7 |
| Aspartic acid g | 2.2 | 1.4 | 2.6 |
| Cystine g | 0.4 | 0.1 | 0.3 |
| Glutamic acid g | 3.6 | 4.4 | 4.3 |
| Glycine g | 0.4 | 0.5 | 0.9 |
| Histidine g | 0.4 | 0.6 | 0.6 |
| Isoleucine g | 1.4 | 1.2 | 1.1 |
| Leucine g | 0 | 0 | 0 |
| Lysine g | 1.9 | 1.6 | 1.4 |
| Methionine g | 0 | 0 | 0 |
| Phenylalanine g | 0.7 | 1 | 1.2 |
| Proline g | 1.4 | 2.2 | 1.2 |
| Serine g | 1.1 | 1.2 | 1.2 |
| Threonine g | 1 | 0.9 | 0.8 |
| Tryptophan g | 0.3 | 0.2 | 0.2 |
| Tyrosine g | 0.7 | 1.2 | 0.8 |
| Valine g | 1 | 1.4 | 1.1 |

Although in tables 2 and 3, the levels of leucine or leucine and methionine are shown reduced to zero, in some embodiments of the invention, small amounts of leucine and methionine may be deliberately retained so that the material will stimulate the mTOR pathway to the minimal extent possible while still serving as a complete source of essential amino acids. In other embodiments of the invention, for example embodiments intended for cancer patients or users who anticipate receiving at least some essential amino acids from other sources, the levels of leucine and/or other mTOR stimulating amino acids may be reduced to zero or near zero.

Reaction Methods

The starting protein hydrolysate mix may be prepared according to any number of prior art methods. These include methods described in U.S. Pat. Nos. 2,180,637; 4,427,658; 4,600,588; 5,077,062; 5,356,637; 5,486,461; 6,036,983; 6,455,273 and the like, the contents of these patents are included herein by reference. This process may be facilitated by using a protein hydrolysate mix prepared from a naturally occurring protein source that has unusually low levels of leucine or other amino acids considered objectionable.

Although occasionally the leucine residues of the various intact peptides remaining after prior the enzymatic hydrolysis process will be present on the N or C terminal residues of the peptides, most often the leucine residues will be present in the interior (non-terminal ends) of the peptides.

In some embodiments, the peptides remaining in the starting material may be totally hydrolyzed to free amino acids using non-leucine specific proteases or chemical hydrolysis methods. However often presence of at least some larger peptides is desirable because larger peptides often have desirable properties in terms of flavor and palatability.

Thus, in order to expose leucine residues that are in the interior of larger peptides, without completely degrading the larger peptide to free amino acids, often the use of a leucine endopeptidase or leucyl endopeptidase in the reaction will be desirable.

Such leucine endopeptidases have been described in the literature. For example, Nielsen, et. al., in U.S. Pat. No. 6,036,983 discloses a method of obtaining protein hydrolysates by subjecting a protein substrate to a deamidation process, followed by a specific acting proteolytic enzymes, which may include a Leucyl endopeptidase such as EC 3.4.21.57 and the like. Another example of a Calcium activated enzyme of this type was disclosed by Kim et. al., "Characterization-Calcium-Activated Bifunctional Peptidase of the Psychrotrophic *Bacillus cereus*", The Journal of Microbiology, June 2005, p. 237-243. This enzyme is classed as EC 3.4.21.57—Leucyl endopeptidase.

Similar leucine endopeptidases are also reported by Aducci et. al., "Esterolytic Properties of Leucine-Proteinase, the Leucine-Specific Serine Proteinase from Spinach (*Spinacia oleracea* L.) Leaves, Plant Physiol. (1986) 82, 591-593.

Here the work of Kim will be used as a specific embodiment. Kim discloses a Ca++ stimulated leucine endopeptidase that is produced by the bacteria *Bacillus cereus*. This endopeptidase, which under some conditions also acts as a leucyl aminopeptidase as well, has a strong specificity for hydrolyzing peptides containing leucine at the P1 site.

After cloning and overexpression using a suitable vector, such as the commercially available Champion™ expression system from Invitrogen Corporation, or equivalent, and subsequent purification, the previously prepared protein hydrolysate mixture may be resuspended in a pH optimized buffer (here about pH 7.0 to 9.0, and optionally with about 1 mM Ca++ assuming that the *Bacillus cereus* enzyme is used), and digested.

An example of the results of this digestion process is shown in FIG. 1. Here, to illustrate the nature of the problem, this example is based upon peptide sequence 12-25 of bovine b-casein (IVEULUUUEESITR in the one letter amino acid code, where L corresponds to leucine). This example, which shows a relatively large peptide, was taken from Deutsch et. al., "*Hydrolysis of Sequenced b-Casein Peptides Provides New Insight into Peptidase Activity from Thermophilic Lactic Acid Bacteria and Highlights Intrinsic Resistance of Phosphopeptides*" from APPLIED AND ENVIRONMENTAL MICROBIOLOGY, December 2000, p. 5360-5367. The IVEULUUUEESITR peptide is shown as (100). The leucine residue is shown as (102).

In this embodiment, the enzyme leucine endopeptidase (104) may digest the IVEULUUUEESITR peptide (100) into two smaller peptides, IVEUL (106), and UUUEESITR (108). This exposes the leucine residue at the carboxyl end of the IVEUL peptide (110). Note that because this particular leucine endopeptidase (EC 3.4.21.57) also has leucine aminopeptidase activity as well, any peptides that have N-terminal leucine residues will also be digested, again producing free leucine amino acids.

Next, to liberate the carboxy terminal leucine residue from short peptides, such as IVEUL (106), that contain carboxy terminal leucines (110), the mixture may then be digested with a suitable enzyme such as a c-terminal protease or carboxypeptidase (112) (for example carboxypeptidase Y, which is expressed in yeast and is available in commercial quantities from Thermo Scientific). Other carboxypeptidases may also be used, preferably carboxypeptidases that have a high affinity for leucine. For example, Folk et. al., "The porcine pancreatic carboxypeptidase A system" Journal of Biological Chemistry, 238 (12) 1963, p 3884 reports that porcine carboxypeptidase A has a particularly high affinity for carboxyl terminal leucine residues. In this example, this reaction will result in the still shorter peptide IVEU (114) and free leucine (116).

Once the leucine residues have been liberated from the N and C terminal ends of the peptides, (116) the free leucines may then be degraded by any leucine specific degrading enzyme or enzymes. In general, the leucine degrading enzyme(s) should be chosen to produce either non toxic reaction products, or alternatively reaction products that can be easily separated from the nutritional material by standard chemical processing techniques.

One enzyme that may be used to degrade the free leucine is L-leucine dehydrogenase, EC 1.4.1.9. This enzyme catalyses the reaction:

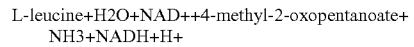
L-leucine+H2O+NAD++4-methyl-2-oxopentanoate+
NH3+NADH+H+

4-methyl-2-oxopentanoate is a non-toxic substance, and is occasionally used as a flavoring agent in foods. It has been described as having a buttery odor. Thus this material may either be retained in the reaction mix, or extracted by chemical means, as desired.

L-leucine dehydrogenase is available in large quantities. Indeed *Bacillus stearothermophilus* leucine dehydrogenase has been cloned into *E-coli* and expressed at levels of up to 30% total soluble protein. This was described by Matsuyama et. al., "Leucine Dehydrogenase from *Bacillus stearothermophilus*: Identification of Active-Site Lysine by Modification with Pyridoxal Phosphate", J Biochem. 1992 August; 112(2): 258-65.

Ohshima et. al., U.S. Pat. No. 4,546,077 also discloses a process for producing a stable and heat resistant leucine dehydrogenase from a microbial source (*Bacillus stearothermophilus*). However his work was focused the on use of the enzyme for research and analytical applications.

If this enzyme is used, it may be advantageous to include additional enzymes in the reaction mix to regenerate the NADH back into NAD+.

Alternatively, other leucine degrading enzymes, such as the enzyme Leucine transaminase EC 2.6.1.6 may also be used to degrade the free leucine molecules. Here the reaction is:

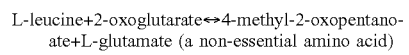
L-leucine+2-oxoglutarate⇌4-methyl-2-oxopentano-
ate+L-glutamate (a non-essential amino acid)

This reaction is also shown in FIG. 1. Here leucine transaminase (118) is transforming the free leucine (116) into the amino acid L-glutamic acid (120). Thus, in this example, assuming a casein protein starting protein hydrolysate, the net result is a minor increase in the amount of L-glutamic acid from the original level of 4.4 grams of glutamic acid per 21.9 grams of amino acids to 4.4+1.8 grams of glutamic acid per 21.9 grams of amino acids, or roughly a change from 20% glutamic acid composition to roughly 28% glutamic acid composition. In the event that the higher levels of glutamic acid are considered objectionable, the levels of glutamic acid may be reduced by suitable chemical or enzymatic methods.

Many other types of enzymatic digestion schemes are also possible. As previously discussed, in alternative embodiments, the peptides in the nutritional material may be converted entirely to amino acids using non-specific proteases or chemical hydrolysis methods. Then the leucine may be degraded using only enzymes such as leucine transaminase, leucine dehydrogenase, or other leucine degrading enzymes.

Preparation of Methionine Reduced Nutrients

As previously discussed, methionine is another amino acid that is suspected of either stimulating the mTOR pathway, or of stimulating an as of yet poorly characterized mTOR-like metabolic pathway. Thus generation of nutritional material depleted in methionine, as well as leucine, is also of commercial interest.

Here enzymatic digestion schemes generally similar to those previously shown for leucine in FIG. 1 may also be used; however different enzymes will be involved.

To generate free methionine, the hydrolyzed proteins can be further digested by endopeptidases to generate smaller peptides, thus either liberating methionine directly, or producing peptides with N-terminal methionine residues. Alternatively, the larger peptides can be cleaved at their methionine residues by purely chemical methods, such as cyanogen bromide (CNBr) cleavage (discussed in U.S. Pat. No. 4,960,868 and elsewhere). However such chemical cleavage processes tend to be expensive and involve use of toxic chemicals, and thus are generally not favored.

Once peptides containing N-terminal methionine residues have been produced, these methinoine residues can be cleaved from the peptides by use of suitable enzymes such as E. coli methionine aminopeptidase, EC 3.4.11.18. This enzyme, which is widely present in nearly all microbial species, can remove N-terminal methionines from peptides, and plays a key role in protein synthesis. This enzyme has been cloned, and is discussed by Ben-Bassat in U.S. Pat. No. 5,013,662. See also See, for example, Frottin et. al., "The Proteomics of N-terminal Methionine Cleavage", Molecular & Cellular Proteomics 5.12, page 2336 (2006).

Nonspecific endopeptidases, carboxypeptidases, and aminopeptidases may also be used in this scheme to further liberate free methionine amino acids as needed.

Once the free methionine amino acids are generated, these in turn can be degraded by other methionine processing enzymes. For example, free methionine may be enzymatically converted to various products, such as S-Adenosyl methionine (SAM, SAMe, SAM-e), by enzymes such as methionine adenosyltransferase EC 2.5.1.6. SAM or SAMe is itself used as a dietary supplement, and for some users, presence of appreciable amounts of SAM (SAMe) in the resulting product may be acceptable, and indeed desirable. For other users who may object to excess SAM (SAMe) present in the product, the SAM in turn may be degraded to L-homocysteine and adenosine by other enzymes, or alternatively extracted by chemical techniques.

Another useful enzyme for purposes of degrading free methionine is L-methionine g-lyase, EC 4.4.1.11, which is present in bacteria such as brevibacterium linens. This enzyme can convert L-methionine to a-ketobutyrate. Such enzymes have been cloned, and are discussed in U.S. Pat. No. 5,863,788. Further discussion can be found in Bonnarme et. al., Diversity of L-Methionine Catabolism Pathways in Cheese-Ripening Bacteria, Applied and Environmental Microbiology, 66 (12), December 2000, p. 5514-5517. The a-ketobutyrate can then be chemically extracted from the resulting nutrient.

Other methionine degrading enzymatic methods may also be used. As an alternative, Perpete et. al. in "Methionine catabolism in Saccharomyces cerevisiae", FEMS Yeast Res., 6:48-56, (2006), has shown that the yeast Saccharomyces cerevisiae has enzymatic pathways that can convert L-methionine to MOBA, where it then can be decarboxylated to methional and finally reduced to methionol.

Post Processing

After specific amino acid depletion and removal of any objectionable by-products, the resulting leucine or other amino acid depleted material may be converted to a solid or liquid form (often a powder), and sold as is. Often, however, the material will first be converted to a consumable food item and then sold.

Here, the preferred method is to combine the material's amino acids and peptides with other mTOR non-stimulating nutrients, such as low glycemic index carbohydrates, and healthy lipids. Examples of such healthy lipids include monounsaturated fats, polyunsaturated fats, and omega-3 fatty acids. Vitamins, minerals, flavorings and colorings may also be added to improve palatability. The resulting material will often then be processed into a consumable liquid, semisolid food, or solid food. Often the food will be designed in multiple forms and be supplemented so that an individual wishing to pursue a diet intended to mimic the effects of caloric restriction, but with a higher level of calories, can safely consume these foods on a long-term basis.

Although, throughout this disclosure, certain specific enzymes have been used as an example of methods that may be used to deplete amino acid containing nutrients of certain mTOR stimulating amino acids, it should be understood that other methods, including chemical methods, heat methods, or even exposure to certain wavelengths of electromagnetic radiation such as infrared, microwave, or radio energy electromagnetic radiation may be used to specifically deplete the levels of mTOR stimulating amino acids. Alternatively, through genetic engineering or selective breeding methods, various plants or microbial organisms may be created that produce large quantities of leucine deficient or other mTOR stimulating amino acid deficient proteins, and these sources may also be utilized to produce large quantities of nutritional compositions having lower mTOR pathway stimulating activity.

The invention claimed is:

1. A method of producing a protein derived nutritional material with reduced mTOR pathway stimulating activity, said method comprising:

treating a protein or protein derived starting material with a plurality of enzymes that together are capable of converting mTOR pathway stimulating amino acids or amino acid residues in said starting material into one or more alternate chemical entities that do not stimulate said mTOR pathway, while preserving quantities of other non-mTOR stimulating amino acids present in said starting material, thereby producing enzyme treated protein derived nutritional material comprising a mixture of peptides and amino acids with reduced mTOR pathway stimulating activity;

wherein said peptides comprise amino acid residues, and said mTOR pathway stimulating amino acids or amino acid residues comprise leucine or leucine residues;

wherein said plurality of enzymes comprise three enzymes comprising both leucine endopeptidase and carboxypeptidase enzymes with at least one of leucine transaminase or L-leucine-dehydrogenase enzyme; and using said enzyme treated protein derived nutritional material for consumption by an adult human as part of a diet.

2. The method of claim 1, wherein said leucine endopeptidases are of class EC 3.4.21.57, said L-leucine dehydrogenases are of class EC 1.4.1.9, and said leucine transaminases are of class EC 2.6.1.6.

3. The method of claim 1, further reducing levels of methionine in said starting material, wherein said plurality of enzymes additionally further comprises enzymes selected from a second group consisting of methionine aminopeptidases, methionine adenosyltransferases, L-methionine g-lyases, and other methionine degrading enzymes.

4. The method of claim 3, wherein said methionine aminopeptidases are of class EC 3.4.11.18, said methionine adenosyltransferases are of class EC 2.5.1.6, and said L-methionine g-lyases are of class EC 4.4.1.11.

5. The method of claim 1, wherein said starting material comprises enzymatically hydrolysed proteins.

6. The method of claim 1, wherein said starting material is selected from the group consisting of casein proteins, whey proteins, soy proteins, egg proteins, pea proteins, rice proteins, or other natural protein source that is naturally deficient in leucine.

7. The method of claim 1, wherein at least some of said plurality of enzymes perform leucine conversion or degradation, and wherein after said leucine conversion or degradation, said protein derived nutritional material is combined with carbohydrates and lipids, and is processed into a consumable liquid, semisolid food, or solid food.

8. The method of claim 7, wherein said carbohydrates are at least one of low glycemic index and low glycemic load carbohydrates, and said lipids are selected from the group consisting of medium chain triglycerides, monounsaturated fats, polyunsaturated fats, and omega-3 fatty acids.

9. The method of claim 1, wherein said one or more alternate chemical entities are non-toxic and suitable for consumption; or said one or more alternate chemical entities are removed from said protein derived nutritional material prior to consumption.

10. The method of claim 1, wherein said diet is a long term artificial diet intended to either mimic the effects of a long term caloric restriction diet for life extension purposes, or for cancer treatment.

11. The method of claim 3, wherein said mTOR pathway stimulating amino acids or amino acid residues comprise any of leucine, leucine residues, methionine, and methionine residues.

* * * * *